United States Patent [19]

Takenakajima et al.

[11] Patent Number: 5,014,752
[45] Date of Patent: May 14, 1991

[54] NONFREEZING PIPE

[75] Inventors: Takefumi Takenakajima, Yao; Kazuo Nishimura, Kyoto; Mamoru Fujiyama, Nara; Toshihiro Fukushima, Kyoto, all of Japan

[73] Assignee: Zojirushi Vacuum Bottle Co., Ltd., Osaka, Japan

[21] Appl. No.: 423,667

[22] Filed: Oct. 19, 1989

Related U.S. Application Data

[63] Continuation of Ser. No. 200,519, May 16, 1989, abandoned.

Foreign Application Priority Data

| Aug. 11, 1987 | [JP] | Japan | 62-12297 |
| Aug. 19, 1987 | [JP] | Japan | 62-126595 |
| May 27, 1989 | [JP] | Japan | 62-80178 |

[51] Int. Cl.$^5$ .............................. F16L 9/14
[52] U.S. Cl. ...................... 138/149; 138/32; 138/148
[58] Field of Search ............... 138/26, 32, 148, 149, 138/178

[56] References Cited

U.S. PATENT DOCUMENTS

| 69,869 | 10/1867 | Vaux | 138/32 |
| 239,284 | 3/1881 | Weisbarth | 138/32 |
| 841,615 | 1/1907 | Brown et al. | 138/32 |
| 903,878 | 11/1908 | Mock | 138/148 X |
| 935,471 | 9/1909 | Day | 138/148 |
| 1,340,332 | 5/1920 | Fitzpatrick | 138/32 |
| 2,419,278 | 4/1947 | Motsenbocker | 138/149 X |
| 2,841,203 | 7/1958 | Gronemeyer | 138/148 |
| 3,259,402 | 7/1966 | Wyatt | 138/149 |
| 3,275,345 | 9/1966 | Waldron et al. | 138/148 X |
| 3,369,826 | 2/1968 | Boosey et al. | 138/149 |
| 3,870,346 | 3/1975 | Kappeler et al. | 138/149 |
| 4,130,301 | 12/1978 | Dunhame et al. | 138/149 |
| 4,139,024 | 2/1979 | Adorjan | 138/149 |
| 4,219,224 | 8/1980 | Hanley | 138/149 |
| 4,515,397 | 5/1985 | Nowobilski et al. | 138/149 |

FOREIGN PATENT DOCUMENTS

| 114638 | 4/1929 | Austria . |
| 852302 | 1/1977 | Belgium . |
| 1551570 | 1/1970 | Fed. Rep. of Germany . |
| 1775073 | 6/1971 | Fed. Rep. of Germany . |
| 3419496 | 12/1984 | Fed. Rep. of Germany . |
| 1413954 | 9/1965 | France . |
| 8603819 | 7/1987 | PCT Int'l Appl. . |

Primary Examiner—James E. Bryant, III
Attorney, Agent, or Firm—Jones, Tullar & Cooper

[57] ABSTRACT

The nonfreezing pipe with a double wall construction comprises an inner shell having openings at its opposite ends, an outer shell extending axially around the inner shell to form an annular space surrounding the inner shell, and at least one end closure member connecting between one end of the outer shell and the external wall portion of the inner shell. The annular space is evacuated.

7 Claims, 3 Drawing Sheets

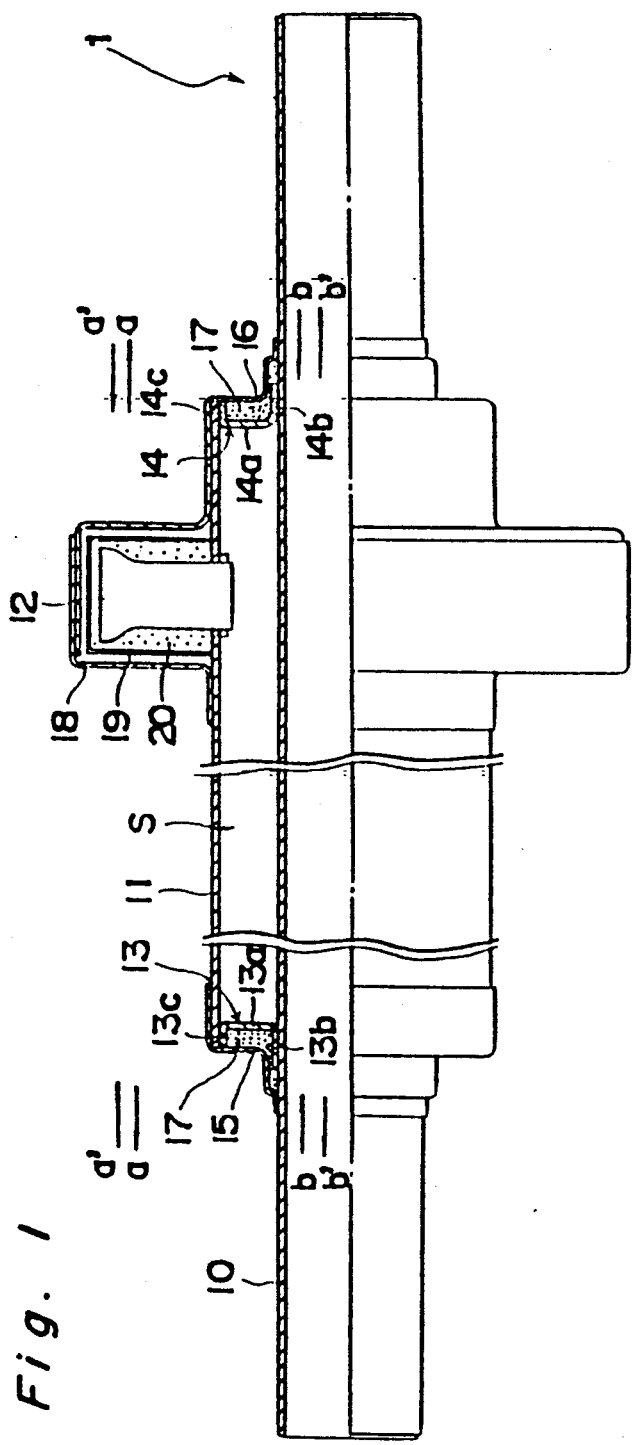
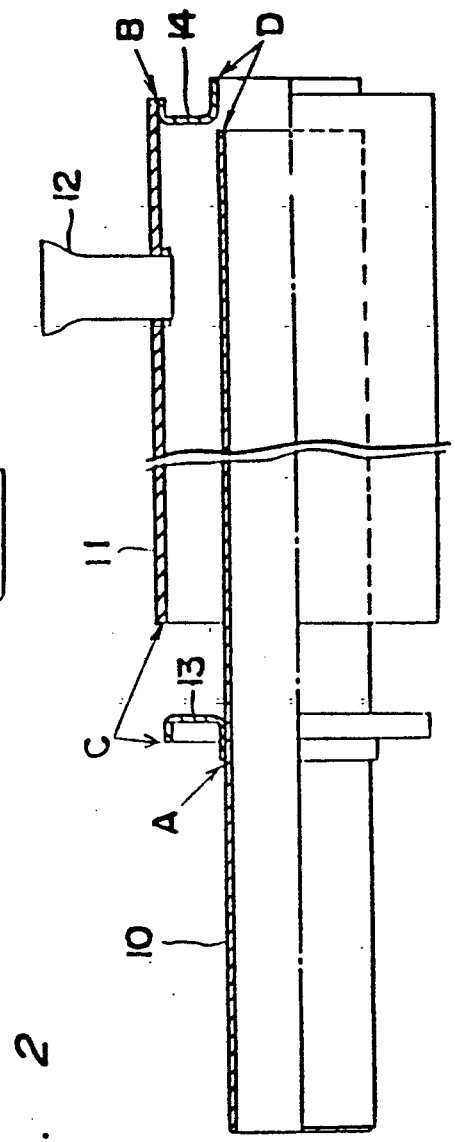

NONFREEZING PIPE

This is a continuation of co-pending application Ser. No. 07/200,519 filed on May 16, 1989 now abandoned.

BACKGROUND OF THE INVENTION

This invention relates to a nonfreezing pipe and, more particularly, to a nonfreezing pipe for use as a water supply pipe extending from a pipe laid under the ground to a point of use over the ground or in the interior of architecture.

To avoid freezing of liquid flowing through pipelines, it has generally been carried out to insulate the pipelines subjected to the cold with heat insulation materials surrounding the external wall portion of the pipelines. However, these insulation materials and covering materials thereof are progressively deteriorated by changes in environmental conditions, resulting in breaking or lowering in insulating properties. For this reason, it is frequently required to repair or replace the heat insulation materials with new ones. Such a maintenance is expensive and takes a lot of time.

To solve such problems, it has been proposed to use a nonfreezing pipe comprising cylindrically shaped concentric inner and outer shells, the outer shell being tapered at its opposite ends and seam welded to the exterior wall portion of the inner shell at the opposites ends to form a double walled construction, the space between said inner and outer shells being evacuated of air to provide heat insulation (Japanese utility model application laying open No. 59-151971).

Such a nonfreezing pipe has excellent heat insulation properties so that it makes it possible to prevent the water from freezing. However, the nonfreezing pipe of the prior art has some serious problems awaiting a solution. For example, it is difficult to produce reliable nonfreezing pipes because of its construction. In general, the nonfreezing pipe is produced by a method comprising the steps of joining inner and outer shells at portions where tapered ends of the outer shell are in contact with the exterior wall portions of the inner shell to form a double walled pipe, evacuating a space between the inner and outer shells through a tip tube or suction port previously provided on or in the outer shell, and then closing the tip tube or sealing the suction port with a flap to complete a nonfreezing pipe. Because the double walled pipe is heated to an elevated temperature during evacuation, and because the inner shell is covered with the outer shell, the thermal expansion of the inner shell becomes smaller than that of the outer shell, resulting in generation of an excess stress acting on the joints between the inner and outer shells. Such an excess stress causes cracking in the joint at the time of cooling or aging of the resultant nonfreezing pipe.

SUMMARY OF THE INVENTION

It is therefore an object of the present invention to provide a nonfreezing pipe which is easy to produce and has excellent reliability and heat insulation properties.

Another object of the present invention is to provide a nonfreezing pipe which is prevented from stress cracking.

Still another object of the present invention is to provide a nonfreezing water supply system which is simple in construction and inexpensive.

According to the present invention the above objects are solved by providing a nonfreezing pipe comprising an inner shell having openings at its opposite ends, an outer shell extending axially around the inner shell to form an annular space surrounding the inner shell, and at least one end closure member connected between one end of the outer shell and the external wall portion of the inner shell to provide an end closure wall for the annular space, the space being evacuated.

In one embodiment of the present invention, the outer shell of the nonfreezing pipe is tapered at its one end so as to have a diameter approximately equal the outside diameter of the inner shell, and connected to the outside wall of the inner shell. In this, the other end of the outer shell is sealed by an end closure member extending radially from the exterior wall portion of the inner shell, the space formed by the inner and outer members and the end closure member being in vacuo.

In a preferred embodiment, the nonfreezing pipe comprises a cylindrically shaped outer shell, an inner shell extending coaxially or centrally through the outer shell, and two end closure members arranged at both ends of the outer shell to connect between the ends of the outer shell and the external wall portions of the inner shell so as to provide end closure walls for an elongated cylindrically shaped space, the space being evacuated to provide heat insulation.

The end closure member is generally formed in the form of a cylindrical member composed of two cylindrical portions and a ring portion connecting the two cylindrical portions, so that it has a U-shaped cross section, M-shaped cross section, Z- shaped cross section, or the like.

In another preferred embodiment, the external wall portion, i.e., the surface facing the vacuum space of the inner shell is covered or provided with a heat reflective material in the form of a foil, film or deposited layer. As a heat reflective material, there may be used those such as aluminum foil, copper foil, chemically or physically deposited silver coatings, and the like.

In another preferred embodiment, the nonfreezing pipe comprises a feed pipe having openings at its opposite ends, and a heat insulating shell extending around the feed pipe to provide a space around the feed pipe, the heat insulating shell having a double walled construction and comprising an inner shell having openings at its opposite ends, an outer shell extending axially around the inner shell to form an annular space surrounding the inner shell, and at least one end closure member connecting between one end of the outer shell and the external wall portion of the inner shell to provide an end closure wall for the annular space, the space between the two shells being evacuated. The heat insulating shell extends around the feed pipe and is coaxially mounted at its one end on the feed pipe by a fixing member.

The invention will be further apparent from the following description taken in conjunction with the accompanying drawings which show, by way of example only, some preferred embodiments thereof.

BRIEF EXPLANATION OF THE DRAWINGS

FIG. 1 is a partial cut away side view of a nonfreezing pipe embodying the present invention;

FIG. 2 is a partial cut away side view of the nonfreezing pipe of FIG. 2 showing a condition where an inner shell is being inserted into the outer shell;

PREFERRED EMBODIMENTS OF THE INVENTION

Figure 3:
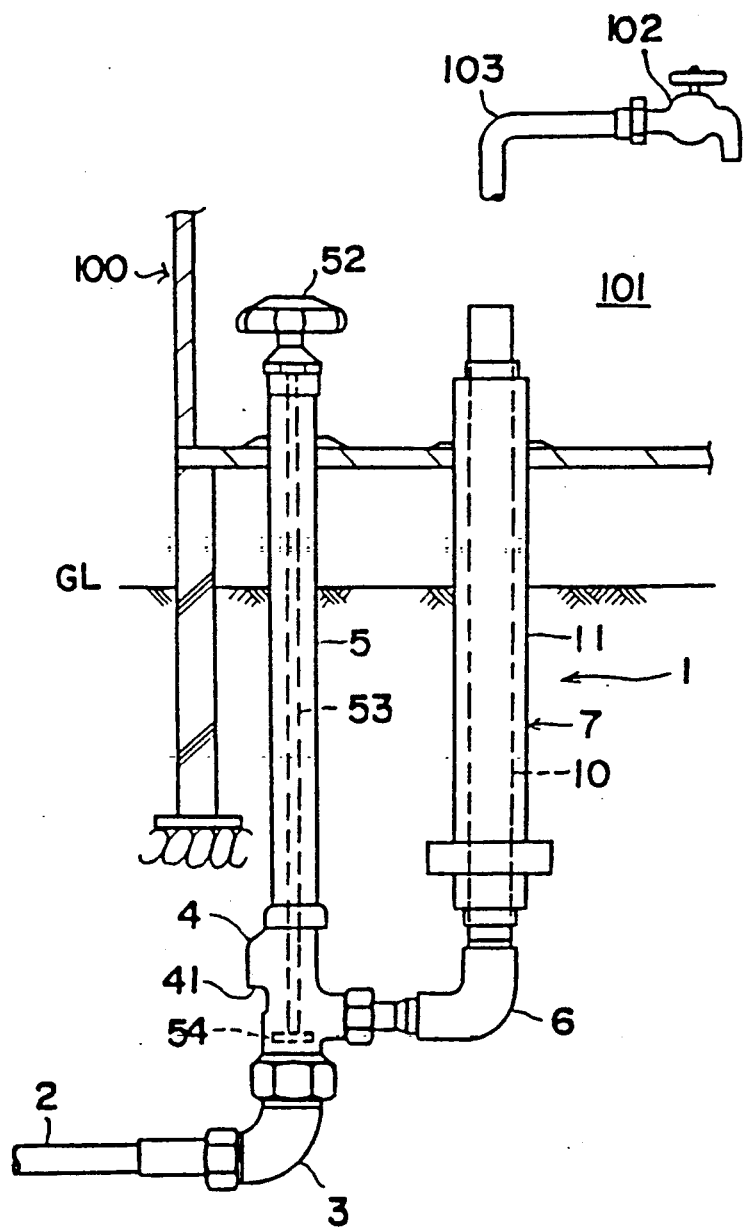
FIG. 3 is an outline of a nonfreezing feed pipe system with the nonfreezing pipe being assembled therein.

Referring now to FIG. 1, there is shown a nonfreezing pipe 1 embodying the present invention that comprises spaced concentric pipes, or inner and outer shells 10 and 11 which are connected by end closure members 13 and 14 at opposite ends of the outer shell 11 to provide an elongated cylindrically shaped space S around the inner pipe 10 so that insulation properties of vacuum in the space S around the inner shell 10 serves to retain heat. The inner shell 10 is communicable at one end to the house service and at the opposite end with a faucet.

The inner shell 10 is covered with a copper foil at its outer periphery facing the vacuum space S to reflect the heat. This copper foil may be replaced with an aluminum foil or chemical silver plating or the like. The inner shell 10 is made of stainless steel and is 22 mm in inside diameter and 1 mm in thickness when used in general use as a feed pipe. If the nonfreezing pipe has a long length, it is preferred to provide one or more spacers on the inner shell 10 to keep the distance between the inner and outer shell 10 and 11 constant and to prevent them from contact.

The outer shell 11 extends coaxially or centrally around the inner shell 10 and is seam welded or similarly joined to the outer cylindrical portions of the end closure members 13 and 14 at the opposite ends. The outer shell 11 is of a stainless steel and has an inside diameter of 42 mm and a thickness of 1.2 mm. At the upstream side, the outer shell 11 is provided with a tip tube 12 of copper for evacuation. In general, it is preferred to provide a getter (not shown) on the interior wall portion of the outer shell 11 at the down stream portion.

The end closure members 13 and 14 are cylindrical members of a stainless steel with a U-shaped cross section, each including a ring portion 13a or 14a, an inner cylindrical portion 13b or 14b, and an outer cylindrical portion 13c or 14c. The inner cylindrical portions 13b and 14b of the end closure members 13 and 14 have an inside diameter equal to or slightly larger than the outside diameter of the inner shell 10, while the outer cylindrical portions 13c and 14c have an outside diameter equal to or slightly smaller than the inside diameter of the outer shell 11. Caps 15 and 16 of a stainless steel are fitted on the inner shell to cover the end closure members, and sealant 17 is filled into spaces formed between the end closure members 13, 14 and caps 15, 16. The sealed tip tube 12 is protected by a cap 18 and the downstream cylindrical portion of the cap 16. This may be replaced with a cap 19. Reference numeral 20 shows a sealant filled in the cap 19. The provision of these caps makes it possible to improve heat insulation properties of the nonfreezing pipe.

The above nonfreezing pipe may be produced in the following manner. For example, the end closure member 13 is firstly fitted on the inner shell 10 so that the free ends of its cylindrical portions 13b and 13c face outwardly, and then joined to the outer periphery of the inner shell 10 at A by welding. On the other hand, the other end closure member 14 is fitted in one of openings of the outer shell 11 so that the free ends of its cylindrical portions face outwardly, and then joined at B to the inner periphery of the upstream (right) end of outer shell 11 by welding. The outer shell 11 is then fitted on the inner shell 10 from the upstream (right) end of inner shell 10 until the upstream end of inner shell 10 protrudes beyond the end closure member 14 for the determined distance.

After concentrically aligning or orienting the inner and outer shells 10 and 11, the end closure members 13 and 14 are respectively joined to the internal wall portion of the outer shell 11 and the external wall portion of the inner shell 10 at C and D to form an annular space S surrounding the inner shell 10. During the fitting step, the tip ends of the inner and outer shells 10 and 11 do not come into contact each other, thus making it possible to form a pipe of a double walled construction easily and smoothly without damaging the copper foil and getter provided on the inner shell 10 or outer shell 11.

The resultant double walled pipe is connected at its tip tube 12 to a vacuum pump (not shown) to exhaust the air in the space S. After exhausting the air in the space to a certain extent, the pipe is placed in a furnace maintained at about 450° C. to evacuate the space S at that temperature. After sealing the tip tube 12, the double walled pipe is cooled to complete the nonfreezing pipe 1.

When heating the double walled pipe in the furnace, the heat from the furnace raises the temperature of the outer shell 11 first, and then the temperature of the inner shell 10, so that the outer shell 11 provides higher thermal expansion as compared to the inner shell 10. For this reason, the end closure members 13 and 14 are deformed by the stress acting thereon in the directions indicated by arrows a and b in FIG. 1.

On the other hand, when cooling the pipe, the outer shell 11 provides larger shrinkage as compared to the inner shell 10 because of higher cooling rate of the outer shell, so that the end closure members 13 and 14 are deformed by the stress acting thereon in the reverse directions indicated by arrows a' and b' in FIG. 1.

As will be understood from the above, the thermal stress produced in the outer and inner shells are absorbed by the end closure members 13 and 14, thus making it possible to prevent the welded portions of the pipe from cracking during its production.

Figure 4:
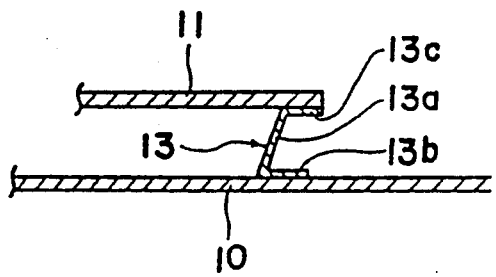
FIG. 4 is a section view showing another embodiment of the nonfreezing pipe.
Figure 5:
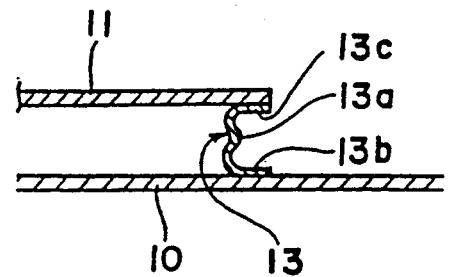
FIG. 5 is a section view showing another embodiment of the nonfreezing pipe of the present invention.

In the foregoing embodiment, the end closure members 13 and 14 are designed to have a U-shaped cross section, but these members may be modified in any form. For example, if one of the end closure members is designed to have a thickness thinner than that of the inner and outer members 10 and 11, it may have a cross section as shown in FIG. 4. Also, these end closure members may have a M-shaped cross section as shown in FIG. 5. In both case, similar effects can be obtained.

Further, evacuation may be carried out by use of a well known vacuum furnace. In this case, the double walled pipe is loaded in the vacuum furnace, heated to a temperature of about 1000° C., and then evacuated through a vacuum suction port previously provided in the outer shell, and the port is closed by a lid member which is previously mounted above the suction port by a suitable supporting means.

The above nonfreezing pipe may be used as a water supply pipe in combination with a three way type valve or cock to constitute a nonfreezing water supply system as shown in FIG. 3. The nonfreezing water supply system comprises a nonfreezing pipe 1 and a drain valve 4 connected thereto through an elbow pipe 6. The drain valve 4 is provided with a drain port 41 open to the ground, and connected at its inlet to an elbow pipe 3 mounted on a house service 2 laid under the ground. The nonfreezing pipe 1 extends vertically from the elbow pipe 6 to the interior 101 of a house or architecture 100 through the floor and terminates therein at a required level. The downstream end of the nonfreezing pipe 1 is connected to an interior water supply pipe 103 extending to a point of use and being provided with a faucet 102 at its end.

In use, the house service 2 is open to the nonfreezing pipe 1 through the valve 4 and the drain port 41 of the valve 4 is closed by a valve disc 54 operated by a handle 52 through a shaft 53 extending through a cover 5. Thus, the water in the house service 2 may flow into the nonfreezing pipe 1 when the faucet 102 is opened. When the water supply is to be stopped for a long time, the handle 52 is operated to close the inlet of the valve 4 with the valve disc 54 and to open the drain port 41, while allowing the water to flow through the faucet 102. Thus, the water remaining in the nonfreezing pipe 1 is drained into the ground through the drain port 41.

It is, however, not necessarily required to drain the water in the nonfreezing pipe 1 since the water in the nonfreezing pipe is prevented from freezing by the heat insulation properties of vacuum. In fact, a freezing test showed that use of the above nonfreezing pipe 1 makes it possible to prevent water from freezing even if most of the nonfreezing pipe except for its opposite ends is subjected to cold of $-30°$ C. for about 80 hours. During this test, the opposite ends of the nonfreezing pipe were kept at 5° C.

Figure 6:
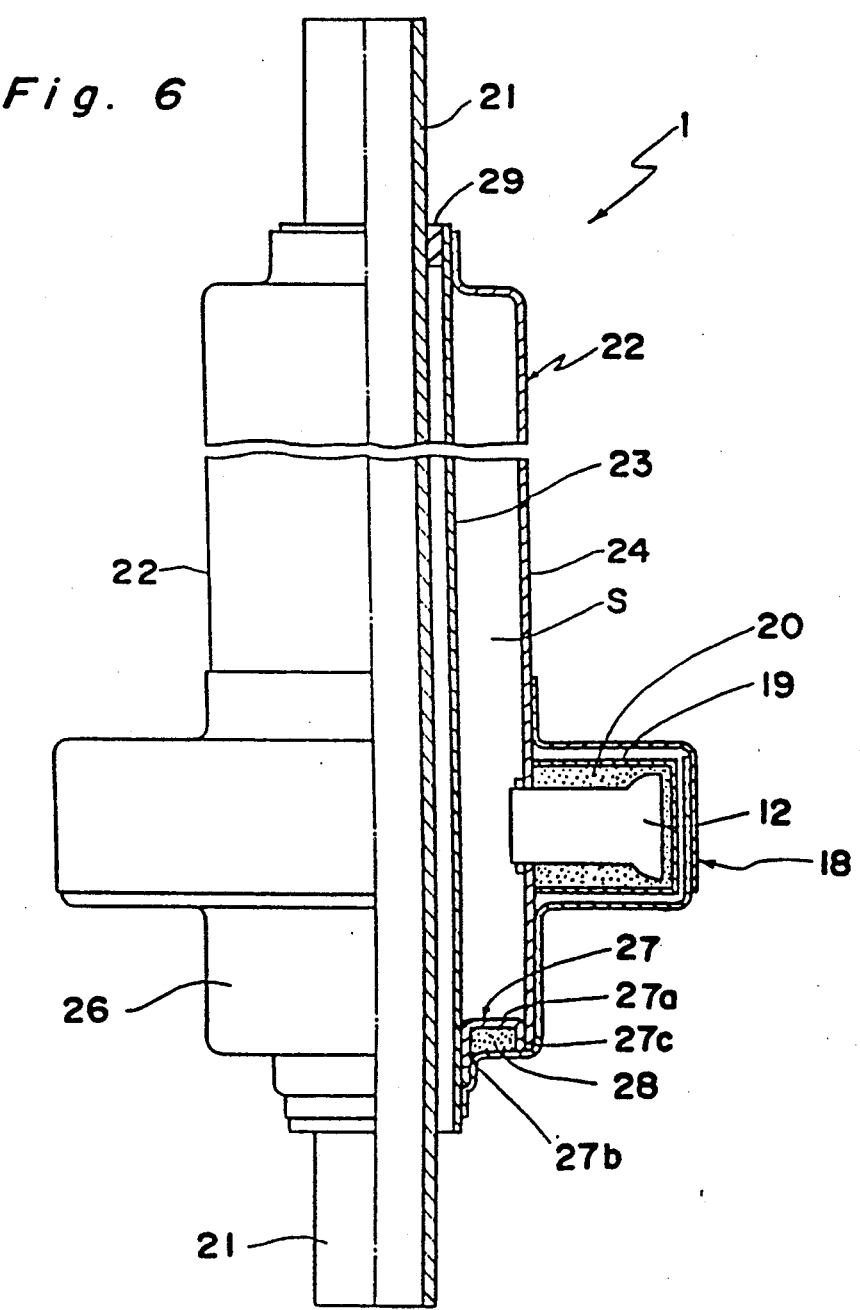
FIG. 6 is a partial cut away side view of another form of a nonfreezing pipe embodying the present invention.

Referring now to FIG. 6, there is shown another embodiment of the nonfreezing pipe of the present invention. This nonfreezing pipe 1 comprises a feed pipe 21 having openings at its opposite ends, and a cylindrically shaped heat insulating shell 22 extending around the feed pipe 21 and having a double walled construction with a space S being evacuated. The heat insulating shell 22 is fixed at its one end to the feed pipe 21 by a fixing member or spacing ring 29.

The heat insulating shell 22 comprises an inner shell 23 having openings at its opposite ends, an outer shell 24 extending axially around the inner shell 23 to form an annular space S surrounding the inner shell 23, and one end closure member 27 connected between one end of the outer shell 24 and the external wall portion of the inner shell 23 to provide an end closure wall for the annular space. The other end of the outer shell 24 is partially closed by an end wall and directly joined to the inner shell 23.

The end closure member 27 is a cylindrical member with a U-shaped cross section including a ring portion 27a, an inner cylindrical portion 27b, and an outer cylindrical portion 27c. The inner cylindrical portion 27b has an inside diameter equal to or slightly larger than the outside diameter of the inner shell 23, while the outer cylindrical portion 27c has an outside diameter equal to or slightly smaller than the inside diameter of the outer shell 24. Cap 26 is fitted on the inner shell 23 to cover the end closure member 27 and the tip tube 12. A suitable sealant 28 is filled into spaces formed between the end closure member 27 and cap 26. The sealed tip tube 12 is protected by cap 18 and 26.

This nonfreezing pipe can be produced in the same manner as above without causing cracking or breaking of the welded portions since the end closure member may deform when applied with excess stress and allows the outer and inner shells to expand or shrink in their axial direction.

What is claimed is:

1. A nonfreezing pipe, for use as a water supply pipe, comprising:
    an inner shell having openings at its opposite ends and being provided on its outer surface with heat reflecting means;
    an outer shell coextensive axially with said inner shell and extending around said inner shell to form a cylindrical space surrounding said inner shell, said outer shell being provided with a tip tube for evacuation;
    at least one deformable end closure member arranged between said inner and outer shell to provide an end closure wall for said cylindrical space, said end closure member having inner and outer cylindrical portions joined respectively to an external wall of said inner shell and to an internal wall of said outer shell by welding, said cylindrical space formed between said inner and outer shells being evacuated of air through said tip tube;
    at least one cylindrical cap fitted on the inner shell so as to cover said end closure member and tip tube, and form a space between said end closure member and cap, said space formed between said end closure member and cap being filled with a sealant; and
    a cylindrical cap fitted on said outer shell to protect said tip tube in combination with said at least one cylindrical cap.

2. The nonfreezing pipe as claimed in claim 1, wherein an opposite end of said outer shell is tapered and joined to the external wall of said inner shell.

3. The nonfreezing pipe as claimed in claim 2, wherein said end closure member has a U-shaped cross section.

4. The nonfreezing pipe as claimed in claim 2, wherein said end closure member has an M-shaped cross section.

5. The nonfreezing pipe as claimed in claim 2, wherein said heat reflecting means is in the form of a foil, film or deposited layer of a heat reflective material selected from the group consisting of aluminum, copper and silver.

6. The nonfreezing pipe as claimed in claim 1, wherein a further deformable end closure member is arranged at the other end of the outer shell to provide a further end closure wall for said cylindrical space, said further closure member having inner and outer cylindrical portions joined respectively to an external wall of said inner shell and to an internal wall of said outer shell.

7. A nonfreezing pipe, for use as a water supply pipe comprising a feed pipe having openings at its opposite ends, a cylindrical heat insulating shell extending around said feed pipe and having a double walled construction and a member for fixing said heat insulating shell to said feed pipe,
    said heat insulating shell comprising:
    an inner shell having openings at its opposite ends and being provided on its external surface with heat reflecting means;

an outer shell coextensive axially with said inner shell and extending around said inner shell to form a cylindrical space surrounding said inner shell, said outer shell being provided with a tip tube for evacuation;

at least one deformable end closure member arranged between said inner and outer shells to provide an end closure wall for said cylindrical space, said end closure member having inner and outer cylindrical portions joined respectively to an external wall of said inner shell and to an internal wall of said outer shell by welding, said cylindrical space formed between said inner and outer shells being evacuated of air through said tip tube;

at least one cylindrical cap fitted on the inner shell so as to cover said end closure member and tip tube, and form a space between said end closure member and cap, said space formed between said end closure member and cap being filled with a sealant; and a cylindrical cap fitted on said outer shell to protect said tip tube in combination with said at least one cylindrical cap.

* * * * *

UNITED STATES PATENT AND TRADEMARK OFFICE
CERTIFICATE OF CORRECTION

PATENT NO. : 5,014,752
DATED : May 14, 1991
INVENTOR(S) : Takefumi Takenakashima et al It is certified that error appears in the above-identified patent and that said Letters Patent is hereby corrected as shown below:

ON THE TITLE PAGE:

Item [63] under Related U.S. Application Data:

The filing date of the original U.S. application "May 16, 1989" should be corrected to --May 26, 1988--.

Item [30] under Foreign Application Priority Data:

The Serial Number of the first Japanese application "62-12297" should be corrected to --62-122978--; and The filing date of the third Japanese application "May 27, 1989" should be corrected to --May 27, 1987--.

Signed and Sealed this

Eighth Day of December, 1992

*Attest:*

DOUGLAS B. COMER

*Attesting Officer*  *Acting Commissioner of Patents and Trademarks*

UNITED STATES PATENT AND TRADEMARK OFFICE
CERTIFICATE OF CORRECTION

PATENT NO. : 5,014,752
DATED : May 14, 1991
INVENTOR(S) : Takefumi Takenakashima, et al.

It is certified that error appears in the above-indentified patent and that said Letters Patent is hereby corrected as shown below:

On the title page, item [75] Inventors: "Takefumi Takenakajima" should read --Takefumi Takenakashima--.

Signed and Sealed this

Twenty-second Day of August, 1995

Attest:

BRUCE LEHMAN

*Attesting Officer*  *Commissioner of Patents and Trademarks*